United States Patent
Anderhuber et al.

(10) Patent No.: US 6,693,264 B2
(45) Date of Patent: Feb. 17, 2004

(54) VACUUM AND GAS TIGHT ENCLOSURE FOR INDUCTION HEATING SYSTEM

(75) Inventors: Marc Anderhuber, Saulny (FR); Jean-Philippe Chaignot, Belfort (FR); Claude Couffet, Crozon (FR); Jean Hellegouarc'h, Le Perreux sur Marne (FR); Philippe Roehr, Lautenbach (FR); René Pierret, Metz (FR); Patrick Hug, Feves (FR); Jean-Camille Uring, Colmar (FR); Gérard Griffay, Hauconcourt (FR); Alain Daubigny, Villerupt (FR)

(73) Assignees: Celes (FR); Usinor (FR)

( * ) Notice: Subject to any disclaimer, the term of this patent is extended or adjusted under 35 U.S.C. 154(b) by 0 days.

(21) Appl. No.: 10/122,135

(22) Filed: Apr. 15, 2002

(65) Prior Publication Data

US 2003/0192878 A1 Oct. 16, 2003

(51) Int. Cl.[7] ................................................. H05B 6/26
(52) U.S. Cl. ..................... 219/632; 219/649; 219/651; 219/677; 373/162; 373/165
(58) Field of Search ................................. 219/632, 647, 219/649, 651, 672, 677, 676; 373/162, 164, 165, 158, 155

(56) References Cited

U.S. PATENT DOCUMENTS

| | | | |
|---|---|---|---|
| 2,858,404 A | * 10/1958 | Peach et al. ................. 219/632 |
| 3,180,917 A | * 4/1965 | Morrison et al. ........... 219/647 |
| 3,674,971 A | 7/1972 | Emerson et al. | |
| 3,735,082 A | * 5/1973 | Kasper ....................... 219/676 |
| 3,809,846 A | * 5/1974 | Baumgartner et al. ....... 219/677 |
| 4,431,901 A | * 2/1984 | Hull ........................... 219/632 |
| 4,676,487 A | 6/1987 | Kudinov et al. | |
| 4,960,967 A | * 10/1990 | Buffenoir et al. ........... 219/632 |
| 5,461,215 A | * 10/1995 | Haldeman ................... 219/677 |
| 6,229,126 B1 | * 5/2001 | Ulrich et al. ................ 219/635 |

FOREIGN PATENT DOCUMENTS

| | | |
|---|---|---|
| DE | 939526 | 2/1956 |
| EP | 0 822 733 A1 | 2/1998 |
| FR | 673243 | 1/1930 |
| JP | 11-251049 | * 9/1999 |
| WO | WO 93/17133 | 2/1993 |

* cited by examiner

Primary Examiner—Philip H. Leung
(74) Attorney, Agent, or Firm—Connolly Bove Lodge & Hutz LLP

(57) ABSTRACT

Gastight and vacuum-tight chamber intended to be used in a device for heating a product advancing inside the chamber by electromagnetic induction, characterized in that it comprises a gastight and vacuum-tight sheath made of an electrically insulating, gastight and vacuum-tight material, the inner faces of the sheath being protected by a heat shield consisting of a matrix of tiles made of a thermally insulating material and of a plurality of tubes cooled by the flow of a fluid, the latter being trapped in the matrix of tiles.

11 Claims, 3 Drawing Sheets

VACUUM AND GAS TIGHT ENCLOSURE FOR INDUCTION HEATING SYSTEM

FIELD OF THE INVENTION

The present invention relates to heating a metal product advancing continuously in a protective atmosphere or in a vacuum, by electromagnetic induction.

BACKGROUND OF THE INVENTION

The use of electromagnetic induction heating devices for heat treatment in a protective atmosphere as implemented in hot coating lines (for galvanizing, aluminizing, etc.) or continuous heat treatment lines (for example annealing lines) has been known for a long time.

Generally, two types of induction heating devices are used for these plants, namely one with a longitudinal flux (the inductor consists of several turns through which current passes and which surround the advancing product so as to create a magnetic flux in the direction of advance of the product) and one with a transverse flux (the turns of the inductor are placed in a plane parallel to the surface of the product such that the magnetic flux is perpendicular to this surface).

The use of one or other of these devices is chosen depending on the type of product to be treated. Thus induction with a longitudinal flux is generally suitable for magnetic products whose temperature is required to be in the vicinity of 750° C. (Curie point) whilst induction with a transverse flux is more suitable for heating at a higher temperature, especially for non-magnetic products.

Furthermore, when an uncoated product is involved, which must be treated at a temperature where there is a risk of it oxidizing, the induction heating must be carried out under a protective atmosphere, such as a mixture of hydrogen and nitrogen. The result of this is that the heating device comprises, inter alia, a chamber through which the product to be treated passes and which must be completely airtight so as to prevent any oxidation of the product.

In the known applications of this type of induction heating, induction heating devices are used in a protective atmosphere, in which the heating device is placed directly inside the sealed chamber. The seal is therefore then made all around the induction means, which presents many drawbacks, especially during operations of maintaining these inductors, which require the chamber to be dismantled, or for sealing the passages for the inflow and return of electric current supplying the inductors and for those of the water circuits cooling the latter.

To solve this problem, applications as described, for example, in European patent application published under No. 0 822 733 are known, which uses a heating device comprising induction means and a gastight chamber placed around the advancing product, between the latter and the inductors, the said chamber lying in the direction of advance of the product, upstream and downstream of the inductors.

In this European patent application, the sealed chamber, in its central part enclosed by the actual induction means, consists of a sleeve comprising one or more layers of thermally and electrically insulating fabric and coated with a gastight film able to withstand a temperature of at least 100° C. but never exceeding 750° C. (device operating by induction with a longitudinal flux).

On the other hand, when heating a product to a temperature greater than 750° C. is involved (for example for the bright annealing of stainless steel) using an induction heating device with a transverse or longitudinal flux, the sleeve disclosed in this document is no longer effective at such temperatures, which risks damaging the inductors which typically should not operate at more than 100° C.

BRIEF DESCRIPTION OF THE INVENTION

The present invention therefore aims to overcome such drawbacks by providing an electrically insulating (that is to say transparent to the magnetic flux) gastight and vacuum-tight chamber coupled to a thermally insulating shield which makes it possible to protect the induction means and any magnetic circuit of the electromagnetic induction heating device, and this regardless of how the latter operates (longitudinal flux or transverse flux).

According to the invention, this gastight and vacuum-tight chamber is placed around the advancing product to be heated, between the latter and the induction heating means.

To this end, the gastight and vacuum-tight chamber according to the invention intended to be used in a device for heating a product advancing inside the said chamber by electromagnetic induction is characterized in that it comprises, at least in its central part surrounded by the said induction heating means, a sheath made of an electrically insulating gastight and vacuum-tight material, the inner faces of the said sheath being protected by a heat shield consisting of a matrix of tiles made of a thermally insulating material and of a plurality of tubes cooled by the flow of a fluid, the latter being trapped in the said matrix of tiles.

The role of the heat shield is to ensure a temperature close to 100° C. for the material forming the sheath, while the product to be heated is at a temperature of about 1200° C.

Other characteristics and advantages of the present invention will emerge from the description given below with reference to the appended drawings which illustrate an embodiment thereof which is devoid of any limiting character. In the figures:

DETAILED DESCRIPTION OF THE INVENTION

Figure 1:
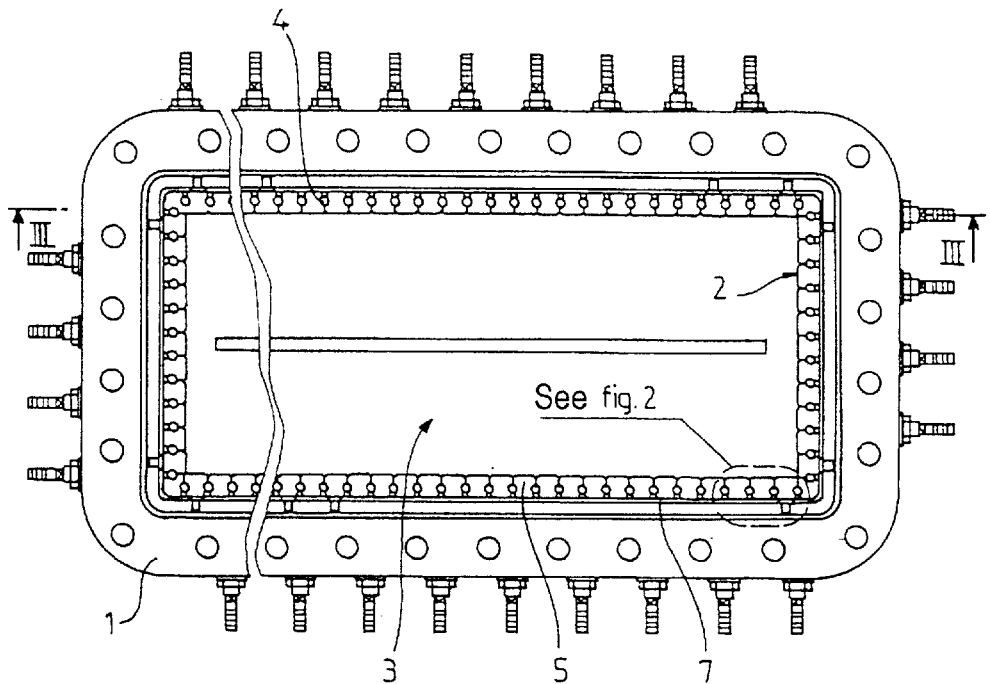
FIG. 1 is a view in cross section of the chamber according to the invention.
Figure 2:
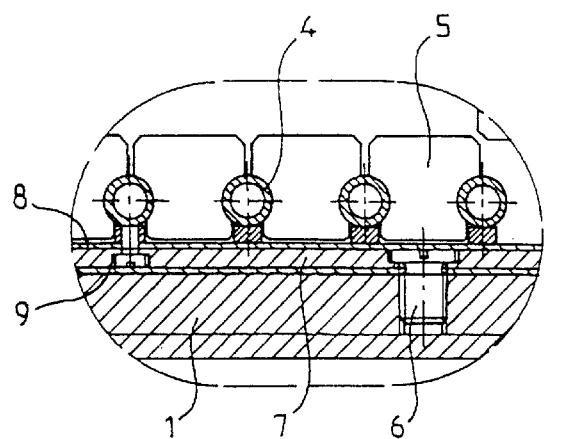
FIG. 2 is a partial enlarged view of a detail of FIG. 1.
Figure 3:
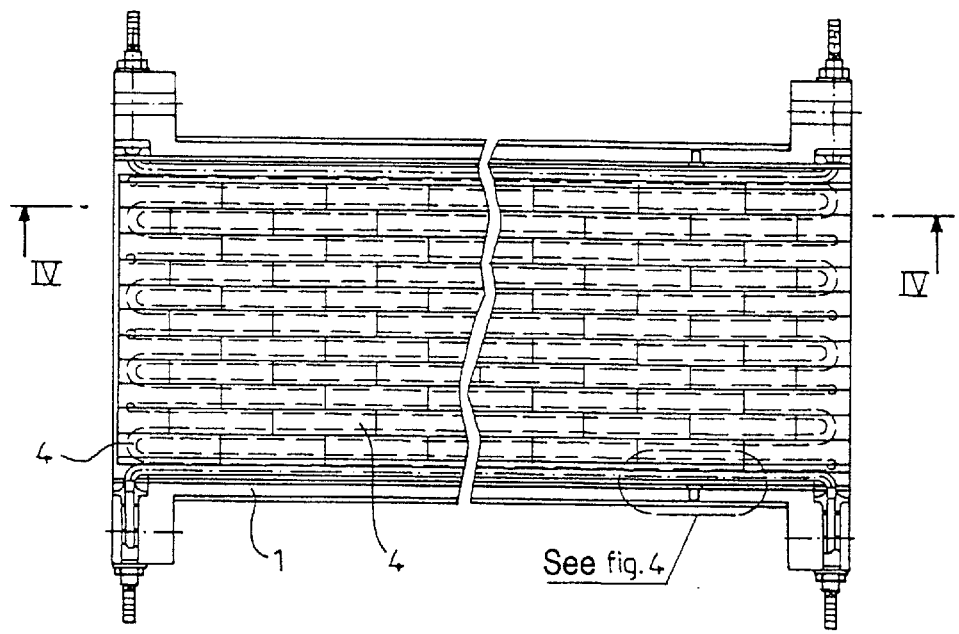
FIG. 3 is a view in section along III—III of FIG. 1.
Figure 4:
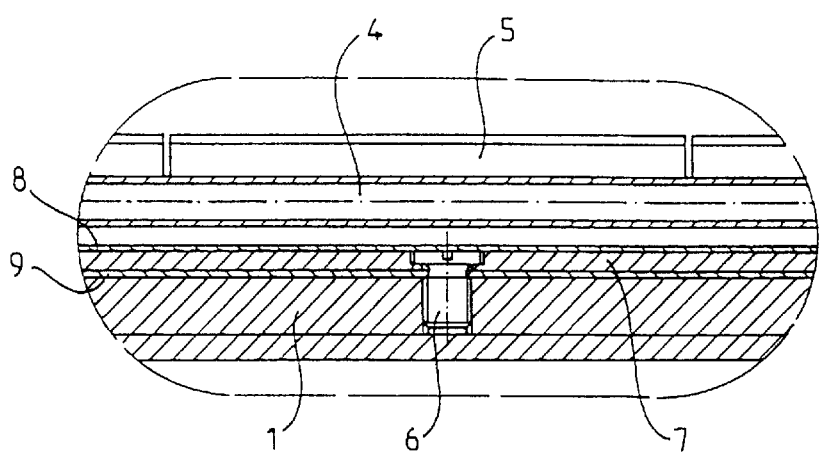
FIG. 4 is a partial view in section along IV—IV of a detail of FIG. 3.

As shown in FIGS. 1 to 4, the electrically insulating gastight and vacuum-tight chamber according to the invention is in the form of an elongated sheath 1 coupled to a heat shield 2.

The space 3 defined inside the said sheath is shaped according to the shape of the product to be treated. For example, the parallelepipedal shaped sheath illustrated in FIGS. 1 to 4 typically represents an application of this device to a strip to be treated.

Of course, this type of chamber can also be applied to any other product, whether or not it is advancing (wire made of steel, copper, aluminium, etc.).

The sheath 1 is therefore intended to surround the advancing product to be treated and is placed between the latter and the induction means of the heating device. It may extend over the entire height of the induction means, but preferably a sheath extending beyond these inductors, upstream and downstream thereof, will be chosen so that the end pieces are not heated by the return of the induction flux.

According to the invention, the usual gastight and vacuum-tight means are provided, respectively at the inlet and at the outlet of the sheath, at the ends of the latter by which the strip to be heated enters and exits in a continuous movement. These conventional design means have not been shown in the drawings.

As illustrated in FIG. 1, the sheath 1 according to the invention is made from a material transparent to the magnetic flux, therefore electrically insulating.

According to a non-limiting embodiment of the invention, the said sheath is made by filament winding of epoxy resin or a similar material.

However, other embodiments are possible without moreover departing from the scope of the present invention and it is possible to use other materials to make the sheath, provided that these materials are transparent to the magnetic flux. Thus, for example, a ceramic or glass sheath could be made according to the invention.

Since the space 3 inside the said sheath is filled with a protective atmosphere (generally consisting of a mixture of nitrogen and of hydrogen) making it possible to prevent any oxidation of the product during the treatment thereof, it is therefore necessary that the sheath 1 is gastight and also vacuum-tight.

Moreover, the sheath must also be electrically non-conducting so that it is not the origin of current induced by the induction flux.

Furthermore, it has good mechanical properties, especially good stiffness, in order to support the heat shield 2 consisting of a plurality of tubes 4 trapped in a matrix of tiles 5 made of ceramic or a similar material, as described below.

This is because the heat shield 2 consists of an assembly of a plurality of tubes 4 placed on all the inner faces of the sheath 1 and through which a fluid, in particular water, flows so as to cool the sheath.

In the advantageous embodiment illustrated in FIGS. 1 to 4, the said cooling tubes are uniformly distributed over all the inner faces of the sheath 1.

According to another advantageous characteristic of the invention (cf. FIG. 3), the tubes 4 preferably consist of stainless steel of small thickness (about 0.5 mm) and they form a plurality of hairpin bends (coiled configuration). These tubes may also be made from a material which is electrically insulating, therefore transparent to the magnetic flux, for example glass or epoxy-glass.

Furthermore, a matrix of tiles 5 made of ceramic or other equivalent insulating materials (concrete, etc.) is placed between each cooling tube 4 so as to cut off the heat radiation from the product to be treated.

The said tiles have a particular geometric shape such that they can fit onto or between the tubes 4 and thus form a matrix trapping the latter, and so that the said tubes are not directly facing the advancing product.

Since the material forming the tiles 5 (ceramic, concrete, etc.) is a very good thermal insulator, the tiles will thus cut off the heat flux radiated by the heated product.

Moreover, the small amount of heat radiated by the said product arriving at the tubes 4 trapped in the said tiles 5 may be extracted by heat exchange with the cooling fluid flowing in the said tubes.

The heat shield 2 consisting of the assembly of tubes 4 and of tiles 5 is mechanically attached to the inner face of the sheath 1 by means of screws 6 or similar attachment means.

Advantageously, a laminated glass sheet 7 (for example having a thickness of about 3 mm) is inserted between this heat shield and the sheath 1, thus facilitating the placement and therefore the attachment of the tubes 4 and tiles 5 to the said sheath, the said laminated sheet 7 itself being placed between two thin layers 8 and 9 of fabric made of ceramic or a similar material.

Of course, in order to obtain optimal efficiency of this heat shield, it has to be ensured that when it is assembled, there is as small a clearance as possible between the sheath 1 and the heat shield 2, and between the tubes 4 and the tiles 5.

An example of applying the insulating and sealed chamber according to the invention to a plant for the heat treatment of an advancing strip will now be described.

Figure 5:
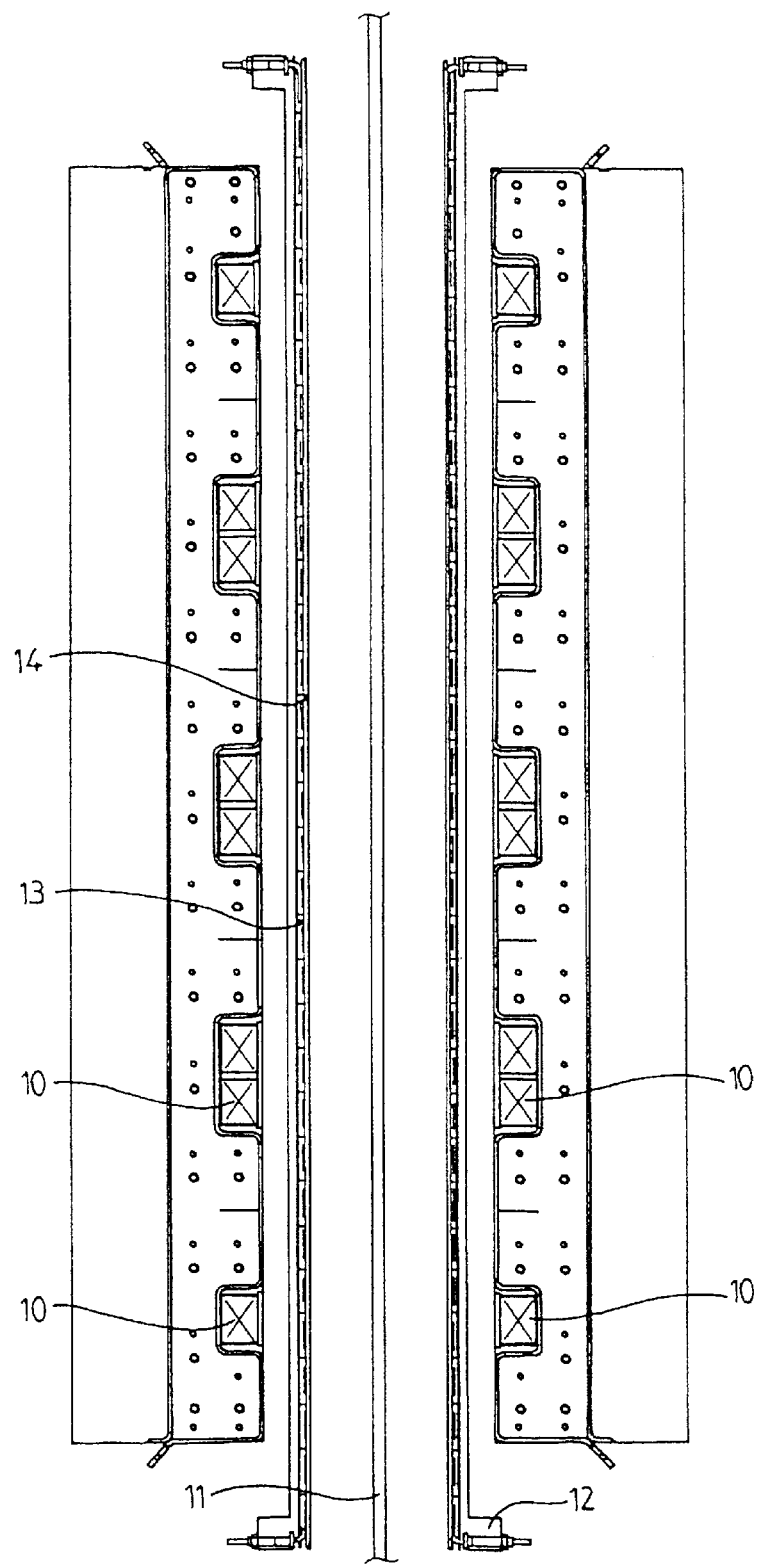
FIG. 5 is a schematic view illustrating part of a heat treatment plant comprising a chamber according to the invention.

In this example, the plant is designed for heating an advancing stainless steel strip under a protective atmosphere with a high hydrogen content. This type of heat treatment typically requires a heating temperature of about 1150° C. In order to reach this, a device for heating by electromagnetic induction, as shown in FIG. 5, is used.

This heating device comprises at least one coil 10, through which current passes, which is placed in a plane parallel to the surface of the advancing strip 11 to be treated such that the transverse magnetic flux is perpendicular to the large surface of the said strip. Furthermore, a chamber 12 according to the invention, as described above, is placed around the strip, between the latter and the coils 10 and preferably lies in a plane perpendicular to the direction of advance of the said strip, upstream and downstream of the turns of the said coils.

The tubes 13 constituting the heat shield of the said chamber are then connected to a collector for inlet and outlet of the cooling fluid, so as to remove a small part of the heat radiated by the strip which has passed through the matrix 14 of tiles made of ceramic or a similar material. Thus, this chamber makes it possible to carry out a dual function: it plays the role of a gastight (or vacuum-tight) box needed for treating the strip, and it makes it possible to protect the said sheath efficiently.

This chamber also makes it possible to intervene directly in the induction coils (especially during the maintenance thereof) without having to break the seal of the said chamber. The chamber according to the invention is thus perfectly suitable for any plant using a protective atmosphere, or operating in a vacuum.

Of course, the present invention is not limited to the embodiments described and shown above, rather it encompasses all the variants thereof.

What is claimed is:

1. A gastight and vacuum-tight chamber for enclosing a product moving through the chamber and subjected to electromagnetic induction heating, the chamber comprising:
   a gastight and vacuum-tight sheath made of electrically insulating, gastight and vacuum-tight material;
   a matrix of tiles made of thermally insulating material forming a heat shield located on inner surfaces of the sheath; and
   a plurality of tubes embedded in the matrix of tiles and carrying a coolant.

2. A chamber according to claim 1, wherein the sheath is made by filament winding of epoxy resin.

3. A chamber according to claim 1, wherein the sheath is made from ceramic.

4. A chamber according to claim 1, wherein the sheath is made from glass.

5. A chamber according to claim 1, wherein the tubes are uniformly distributed over all the inner surfaces of the sheath.

6. A chamber according to claim 1, wherein the tubes form a plurality of hairpin bends, made of stainless steel having a small thickness.

7. A chamber according to claim 1, wherein the tubes are made from a material which is electrically insulating and magnetically transparent to the magnetic flux.

8. A chamber according to claim 7, wherein the tubes are made of glass.

9. A chamber according to claim 7, wherein the tubes are made of epoxy-glass.

10. A chamber according to claim 1, wherein the heat shield is mechanically attached to an inner face of the sheath.

11. Gastight and vacuum-tight chamber intended to be used in a device for heating a product advancing inside the chamber by electromagnetic induction, comprising a sheath made of an electrically insulating, gastight and vacuum-tight material, inner faces of the sheath being protected by a heat shield including a matrix of tiles made of a thermally insulating material and of a plurality of tubes cooled by the flow of a fluid, the latter being trapped in the matrix of tiles, wherein a laminated glass sheet is placed between the sheath and the tubes and tiles.

* * * * *